United States Patent
Olive et al.

(10) Patent No.: US 11,070,536 B2
(45) Date of Patent: Jul. 20, 2021

(54) SYSTEMS AND METHODS FOR A SECURE SUBSCRIPTION BASED VEHICLE DATA SERVICE

(71) Applicant: Honeywell International Inc., Morris Plains, NJ (US)

(72) Inventors: Michael L. Olive, Cockeysville, MD (US); Xiaozhong He, Laurel, MD (US); Phani Ammi Raju Pothula, Peravali (IN)

(73) Assignee: Honeywell International Inc., Charlotte, NC (US)

( * ) Notice: Subject to any disclaimer, the term of this patent is extended or adjusted under 35 U.S.C. 154(b) by 0 days.

(21) Appl. No.: 16/894,529

(22) Filed: Jun. 5, 2020

(65) Prior Publication Data

US 2020/0304479 A1    Sep. 24, 2020

Related U.S. Application Data

(62) Division of application No. 15/970,521, filed on May 3, 2018, now Pat. No. 10,715,511.

(51) Int. Cl.
*H04L 29/06* (2006.01)
*H04L 9/08* (2006.01)
(Continued)

(52) U.S. Cl.
CPC .......... *H04L 63/062* (2013.01); *H04L 9/0866* (2013.01); *H04L 63/0853* (2013.01);
(Continued)

(58) Field of Classification Search
CPC ............. H04L 63/062; H04L 2463/061; H04L 9/0866; H04L 9/0853
(Continued)

(56) References Cited

U.S. PATENT DOCUMENTS

| 4,874,942 A | 10/1989 | Clauser |
| 4,992,656 A | 2/1991 | Clauser |

(Continued)

FOREIGN PATENT DOCUMENTS

| CN | 104994112 A | 10/2015 |
| EP | 1463265 A2 | 9/2004 |
| WO | 2017147207 A1 | 8/2017 |

OTHER PUBLICATIONS

U.S. Patent and Trademark Office, "Notice of Allowance", U.S. Appl. No. 15/970,521, filed Mar. 19, 2020, pp. 1-31, Published: US.

(Continued)

*Primary Examiner* — Haresh N Patel
(74) *Attorney, Agent, or Firm* — Fogg & Powers LLC

(57) ABSTRACT

Secure subscription based vehicle data services are provided. In one embodiment, a device comprises: a non-volatile memory comprising an embedded public key (EPK) that comprises a public key of a public-private key pair associated with a data service system not onboard the vehicle; a protocol that initiates a communication session that includes a session validation sequence that causes a processor to transmit a session request message and validate an authenticity of a session reply request using the EPK; the protocol includes a session initiation sequence that causes the processor to: transmit an initiation request message to the data service system that includes a key derivation key, and apply the key derivation key to a key derivation function to generate a message authentication key. The processor authenticates uplink messages exchanged with a host data service using the message authentication key.

11 Claims, 6 Drawing Sheets

(51) Int. Cl.
*H04W 4/40* (2018.01)
*H04W 12/04* (2021.01)

(52) U.S. Cl.
CPC .......... *H04W 4/40* (2018.02); *H04L 2463/061* (2013.01); *H04W 12/04* (2013.01)

(58) Field of Classification Search
USPC .......................................................... 713/150
See application file for complete search history.

(56) References Cited

U.S. PATENT DOCUMENTS

| | | | |
|---|---|---|---|
| 6,677,888 B2 | 1/2004 | Roy | |
| 7,194,618 B1* | 3/2007 | Suominen | H04L 63/123 |
| | | | 713/155 |
| 7,317,184 B2 | 1/2008 | Kasevich et al. | |
| 7,437,756 B2 | 10/2008 | Bleumer | |
| 7,512,714 B2 | 3/2009 | Eckert | |
| 7,816,643 B2 | 10/2010 | Hyodo | |
| 7,835,734 B2 | 11/2010 | Eckert et al. | |
| 7,952,999 B1* | 5/2011 | Jiang | H04L 63/0227 |
| | | | 370/229 |
| 8,688,987 B2 | 4/2014 | Kirk et al. | |
| 8,966,074 B1 | 2/2015 | Richards et al. | |
| 9,134,450 B2 | 9/2015 | Desruelle et al. | |
| 9,160,539 B1 | 10/2015 | Juels et al. | |
| 9,215,228 B1* | 12/2015 | Zhang | H04L 9/321 |
| 9,294,340 B1 | 3/2016 | Logue et al. | |
| 10,219,154 B1* | 2/2019 | Hallock | H04L 63/083 |
| 10,321,310 B1* | 6/2019 | Scheer | H04L 63/08 |
| 2005/0232428 A1* | 10/2005 | Little | H04L 63/06 |
| | | | 380/277 |
| 2006/0080451 A1 | 4/2006 | Eckert | |
| 2006/0130134 A1 | 6/2006 | Colas | |
| 2006/0249666 A1 | 11/2006 | Kasevich et al. | |
| 2007/0067620 A1* | 3/2007 | Jevans | H04L 9/321 |
| | | | 713/156 |
| 2007/0195775 A1 | 8/2007 | Glassoway | |
| 2008/0005791 A1 | 1/2008 | Gupta et al. | |
| 2008/0044014 A1* | 2/2008 | Corndorf | H04L 9/0637 |
| | | | 380/37 |
| 2008/0044025 A1* | 2/2008 | Corndorf | H04L 9/0844 |
| | | | 380/270 |
| 2008/0046039 A1* | 2/2008 | Corndorf | A61N 1/37254 |
| | | | 607/60 |
| 2008/0073494 A1 | 3/2008 | Hyodo | |
| 2008/0130895 A1 | 6/2008 | Jueneman et al. | |
| 2009/0006926 A1 | 1/2009 | Koppelaar et al. | |
| 2010/0037311 A1 | 2/2010 | He et al. | |
| 2010/0185864 A1* | 7/2010 | Gerdes, Jr. | H04L 9/3213 |
| | | | 713/175 |
| 2010/0199086 A1 | 8/2010 | Kuang et al. | |
| 2010/0262715 A1 | 10/2010 | Tamalet et al. | |
| 2011/0161248 A1* | 6/2011 | Cai | H04L 12/1467 |
| | | | 705/400 |
| 2011/0255506 A1 | 10/2011 | Toth et al. | |
| 2011/0289003 A1* | 11/2011 | Womack | G06F 21/105 |
| | | | 705/59 |
| 2012/0177198 A1* | 7/2012 | Cabos | H04L 63/0428 |
| | | | 380/270 |
| 2012/0210783 A1 | 8/2012 | Carroll et al. | |
| 2012/0216286 A1 | 8/2012 | Johnson et al. | |
| 2012/0252493 A1* | 10/2012 | Siddeley | H04L 67/18 |
| | | | 455/456.2 |
| 2013/0073672 A1* | 3/2013 | Ayed | H04L 67/306 |
| | | | 709/217 |
| 2013/0326214 A1* | 12/2013 | McCanna | H04W 12/48 |
| | | | 713/156 |
| 2014/0190254 A1 | 7/2014 | Bouyer et al. | |
| 2014/0241523 A1* | 8/2014 | Kobres | G06F 21/71 |
| | | | 380/28 |
| 2014/0365694 A1 | 12/2014 | Bolton et al. | |
| 2015/0005989 A1 | 1/2015 | Beltrand | |
| 2015/0023183 A1* | 1/2015 | Ilsar | H04W 48/16 |
| | | | 370/244 |
| 2015/0128207 A1* | 5/2015 | Cabrera | H04L 63/20 |
| | | | 726/1 |
| 2015/0312761 A1* | 10/2015 | Subramanian | H04W 12/08 |
| | | | 455/411 |
| 2015/0373154 A1* | 12/2015 | Voigt | H04L 12/66 |
| | | | 370/389 |
| 2016/0072781 A1* | 3/2016 | Zhang | H04L 63/08 |
| | | | 726/4 |
| 2016/0163202 A1 | 6/2016 | Marion et al. | |
| 2016/0183087 A1 | 6/2016 | Lehtinen et al. | |
| 2016/0212099 A1* | 7/2016 | Zou | H04L 63/0263 |
| 2016/0241389 A1 | 8/2016 | Le Saint et al. | |
| 2016/0277545 A1 | 9/2016 | Kwak et al. | |
| 2016/0286043 A1* | 9/2016 | John | H04M 3/42144 |
| 2016/0315766 A1* | 10/2016 | Ujiie | H04L 9/083 |
| 2016/0337406 A1* | 11/2016 | Lietz | H04L 63/10 |
| 2017/0046211 A1 | 2/2017 | Jayawardena et al. | |
| 2017/0111692 A1 | 4/2017 | An et al. | |
| 2017/0134164 A1* | 5/2017 | Haga | G06F 21/572 |
| 2017/0295031 A1 | 10/2017 | Bush et al. | |
| 2017/0303123 A1* | 10/2017 | Villar | H04K 3/20 |
| 2017/0317975 A1 | 11/2017 | Olive et al. | |
| 2018/0006819 A1 | 1/2018 | Watanabe et al. | |
| 2018/0198846 A1* | 7/2018 | Srinivasan | H04W 12/068 |
| 2019/0028448 A1 | 1/2019 | Farrell | |
| 2019/0095655 A1* | 3/2019 | Krawczewicz | H04W 12/06 |
| 2019/0222986 A1* | 7/2019 | Aitken | H04W 12/06 |
| 2019/0238638 A1* | 8/2019 | Way | G05D 1/0088 |
| 2019/0342274 A1 | 11/2019 | Olive et al. | |
| 2019/0342275 A1 | 11/2019 | Olive et al. | |
| 2021/0006547 A1 | 1/2021 | Olive et al. | |

OTHER PUBLICATIONS

National Intellectual Property Administration, P.R. China, "First Office Action from CN Application No. 201910326994.9", from Foreign Counterpart to U.S. Appl. No. 15/970,522, dated Dec. 30, 2020, p. 1 through 12, Published: CN.

European Patent Office, "Communication pursuant to Article 94(3) EPC from EP Application No. 19172019.2", from Foreign Counterpart to U.S. Appl. No. 19172019.2, from Foreign Counterpart to U.S. Appl. No. 15/970,522, dated Dec. 23, 2020, p. 1 through 4, Published: US.

U.S. Patent and Trademark Office, "Office Action", U.S. Appl. No. 15/970,522, dated Jul. 21, 2020, p. 1 through 45, Published: US.

U.S. Patent and Trademark Office, "Notice of Allowance", U.S. Appl. No. 15/970,522, dated Aug. 20, 2020, p. 1 through 7, Published: US.

Adams, "Securing ASCARS: Data Link in the Post-9/11 Environment", "Avionics Today", "http://www.aviationtoday.com/2006/06/01/securing-acars-data-link-in-the-post-911-environment/", Dated Jun. 1, 2006, Retrieved on Feb. 15, 2018, pp. 1-6, Publisher: Access Intelligence, LLC.

European Patent Office, "Communication pursuant to Article 94(3) from EP Application No. 17168567.0 dated May 17, 2019", from Foreign Counterpart to U.S. Appl. No. 15/498,415, pp. 16, Published: EP.

European Patent Office, "Communication pursuant to Article 94(3) from EP Application No. 17168567.0 dated Oct. 25, 2018", from Foreign Counterpart to U.S. Appl. No. 15/498,415, pp. 1-5, Published: EP.

European Patent Office, "Communication Pursuant to Article 94(3) from EP Application No. 17168567.0, dated Feb. 13, 2018", "from Foreign Counterpart of U.S. Appl. No. 15/498,415", dated Feb. 13, 2018, pp. 1-5, Published in: EP.

European Patent Office, "Extended European Search Report from EP Application No. 17168567.0 dated Jul. 26, 2017", "from Foreign Counterpart of U.S. Appl. No. 15/498,415", filed Jul. 26, 2017, pp. 1-13, Published in: EP.

European Patent Office, "Extended European Search Report from EP Application No. 19172016.8 dated Jun. 4, 2019", from Foreign Counterpart to U.S. Appl. No. 15/970,521, pp. 111, Published: EP.

(56) References Cited

OTHER PUBLICATIONS

European Patent Office, "Extended European Search Report from EP Application No. 19172019.2 dated Jun. 3, 2019", from Foreign Counterpart to U.S. Appl. No. 15/970,522, pp. 1-11, Published: EP.
Mahmoud et al, "An Aeronautical Data Link Security Architecture Overview", "28th Digital Avionics Systems Conference Oct. 25-29, 2009, Orlando, US", "HAL Archives-ouvertes", "https://hal-enac.archives-ouvertes.fr/hal-01022165", Dated Sep. 9, 2014, pp. Cover, 4.A.4-1-4.A.4-14, Publisher: IEEE.
Olive, "ACARS Message Security (AMS) as a Vehicle for Validation of ICAO Doc. 9880 Part IV-B Security Requirements", Jun. 2-5, 2009, pp. 1-12, Publisher: Honeywell.
Olive, "Efficient Datalink Security in a Bandwidth-Limited Mobile Environment—An Overview of the Aeronautical Telecommunications Network (ATN) Security Concept", Dated 2001, pp. 9.E.2-1-9.E.2-10, Publisher: IEEE.
Pasco, "ACARS and Error Checking", Technology, IFEC & IT, Dec. 6, 2015, pp. 1-5, Flight.
Rodriguez-Flores et al, "Compact FPGA Hardware Architecture for Public Key Encryption in Embedded Devices", "PLOS ONE", "https://doi.org/10.1371/journal.pone.0190939", Dated Jan. 23, 2018, pp. 1-21, Publisher: 2018 Rodriguez-Flores et al.
Rushby, "Partitioning in Avionics Architectures: Requirements, Mechanisms,and Assurance", "Retrieved from the Internet: http://www.tc.faa.gov/its/worldpac/techrpt/ar99-58.pdf; retrieved on Jun. 9, 2010", Mar. 2000, pp. 1-68.
Salisbury, "Protected ACARSs (PACARS)", "Baltic Management Directorate, Aerospace Management Systems Division", CNS/ATM Conference 2011, Dated 2011, pp. 1-35, Publisher: The MITRE Corporation.
Smith, et al, "Economy Class Crypto: Exploring Weak Cipher Usage in Avionic Communications via ACARS", 21st International Conference on Financial Cryptography and Data Security, Malta, 2017, pp. 1-18.
Strohmeier, "University of Oxford, Kellogg College, Thesis, "Security in Next Generation Air Traffic Communication Networks"", Dated 2006, pp. 1-204.
U.S. Patent and Trademark Office, "Advisory Action", U.S. Appl. No. 15/498,415, dated Feb. 12, 2020, pp. 1-3, Published: US.
U.S. Patent and Trademark Office, "Final Office Action", U.S. Appl. No. 15/498,415, dated Dec. 6, 2019, pp. 1-20, Published: US.
U.S. Patent and Trademark Office, "Notice of Allowance", U.S. Appl. No. 15/970,521, dated Mar. 19, 2020, pp. 1-31, Published: US.
U.S. Patent and Trademark Office, "Office Action", U.S. Appl. No. 15/498,415, dated Feb. 26, 2019, pp. 1-45, Published: US.
U.S. Patent and Trademark Office, "Office Action", U.S. Appl. No. 15/498,415, dated Aug. 21, 2019, pp. 1-35, Published: US.

* cited by examiner

SYSTEMS AND METHODS FOR A SECURE SUBSCRIPTION BASED VEHICLE DATA SERVICE

CROSS-REFERENCE TO RELATED APPLICATION

This application is a Divisional patent application claiming priority to, and the benefit of, U.S. patent application Ser. No. 15/970,521 titled, "SYSTEMS AND METHODS FOR A SECURE SUBSCRIPTION BASED VEHICLE DATA SERVICE" filed on May 3, 2018, which is hereby incorporated by reference in its entirety.

BACKGROUND

Operators of commercial vehicles, such as aircraft, trains and ships, have an increasing interest in leveraging broadband IP-based datalinks to communicate operations information between the vehicles and central information management systems. This is in part because routing data through broadband IP-based datalinks tend to provide for higher bandwidth and is more cost-effective as compared to traditional datalinks routed through Datalink Service Providers (DSPs). A problem that comes with broadband IP-based datalinks, however, is that communications between the vehicles and the data systems used by the vehicles' operator become susceptible to malicious interference from other traffic sharing the public Internet network. For example, messages that spoof the operator's systems may be received by the vehicle from other users of the network, or even from passengers on the vehicle who are utilizing offered IP communications and entertainment services. In many instances, it is paramount that the on-vehicle communications functions are able to identify authentic uplink messages in order to ensure the safe and efficient operation of the vehicle.

One approach known in the art is to distribute certificates so that on-vehicle communications functions can authenticate that the uplink messages they receive are from the operator's data service systems, and so that the on-vehicle communications functions can authenticate the downlink messages they send to the data service systems. Certificates would permit the on-vehicle communications functions to sign and authenticate the messages it sends and review the certificates of messages it receives to determine their authenticity. However, one problem that exist with this certificate approach is the ongoing need to renew certificates stored on-board the vehicle when they expire. Another is the need to reload a valid certificate when equipment is replaced during maintenance. For example in the case of a commercial aircraft, the aircraft operator may need to quickly pull out an avionics device and replace that unit between flights. New and valid certificates would need to be loaded onto the avionics device to enable to sign downlink messages and authenticate uplink message. A certificate system would therefore increase the time necessary to perform that replacement, which can delay departure schedules. Symmetric key schemes, which do not rely on certificates, and traditional certificate-based asymmetric key schemes are known, but these systems as they exist today also present problems. Specifically, they both force on the on-vehicle communications function to protect either the symmetric key, or the private key of a public/private asymmetric key pair, from disclosure to maintain communications integrity. Providing such protection can increase the cost and complexity of the on-board equipment.

For the reasons stated above and for other reasons stated below which will become apparent to those skilled in the art upon reading and understanding the specification, there is a need in the art for systems and methods for a secure subscription-based vehicle data service.

SUMMARY

The Embodiments of the present disclosure provide methods and systems for a secure subscription-based vehicle data service and will be understood by reading and studying the following specification. In one embodiment, a vehicle communication manager device located onboard a vehicle comprises: a memory comprising a non-volatile memory device storing a fixed embedded public key, wherein the embedded public key is a public key of a public-private key pair associated with a data service system not onboard the vehicle; a processor in communication with a wireless datalink transceiver; a vehicle data service protocol executed by the processor, wherein the vehicle data service protocol initiates a communication session for data service exchanges with the data service system via the wireless datalink transceiver; wherein the vehicle data service protocol includes a session validation sequence that causes the processor to: transmit a session request message to the data service system; and validate an authenticity of a session reply request message received from the data service system using the embedded public key, wherein the session reply message includes a public operational authentication key, a public operational encryption key, and is signed with a subscriber validation private key associated with the embedded public key; wherein the vehicle data service protocol includes a session initiation sequence that causes the processor to: transmit an initiation request message to the data service system, the session request message including a key derivation key generated onboard the vehicle, wherein the key derivation key in the initiation request message is encrypted using the public operational encryption key; validate an authenticity of an initiation response message received from the data service system using the public operational authentication key; and in response to affirmatively validating the initiation response message, apply the key derivation key to a key derivation function to generate a message authentication key; wherein the processor authenticates data service uplink messages received from the host data service during the communication session using the message authentication key.

DRAWINGS

Embodiments of the present disclosure can be more easily understood and further advantages and uses thereof more readily apparent, when considered in view of the description of the preferred embodiments and the following figures in which.

In accordance with common practice, the various described features are not drawn to scale but are drawn to emphasize features relevant to the present disclosure. Reference characters denote like elements throughout figures and text.

DETAILED DESCRIPTION

In the following detailed description, reference is made to the accompanying drawings that form a part hereof, and in which is shown by way of specific illustrative embodiments in which the embodiments may be practiced. These embodiments are described in sufficient detail to enable those skilled in the art to practice the embodiments, and it is to be understood that other embodiments may be utilized and that logical, mechanical and electrical changes may be made without departing from the scope of the present disclosure. The following detailed description is, therefore, not to be taken in a limiting sense.

Embodiments described herein are based on a hybrid symmetric and public-private key system that utilizes an embedded public key in lieu of a public key certificate approach. Moreover, any need to store associated device private keys on the vehicle is eliminated.

Figure 1:
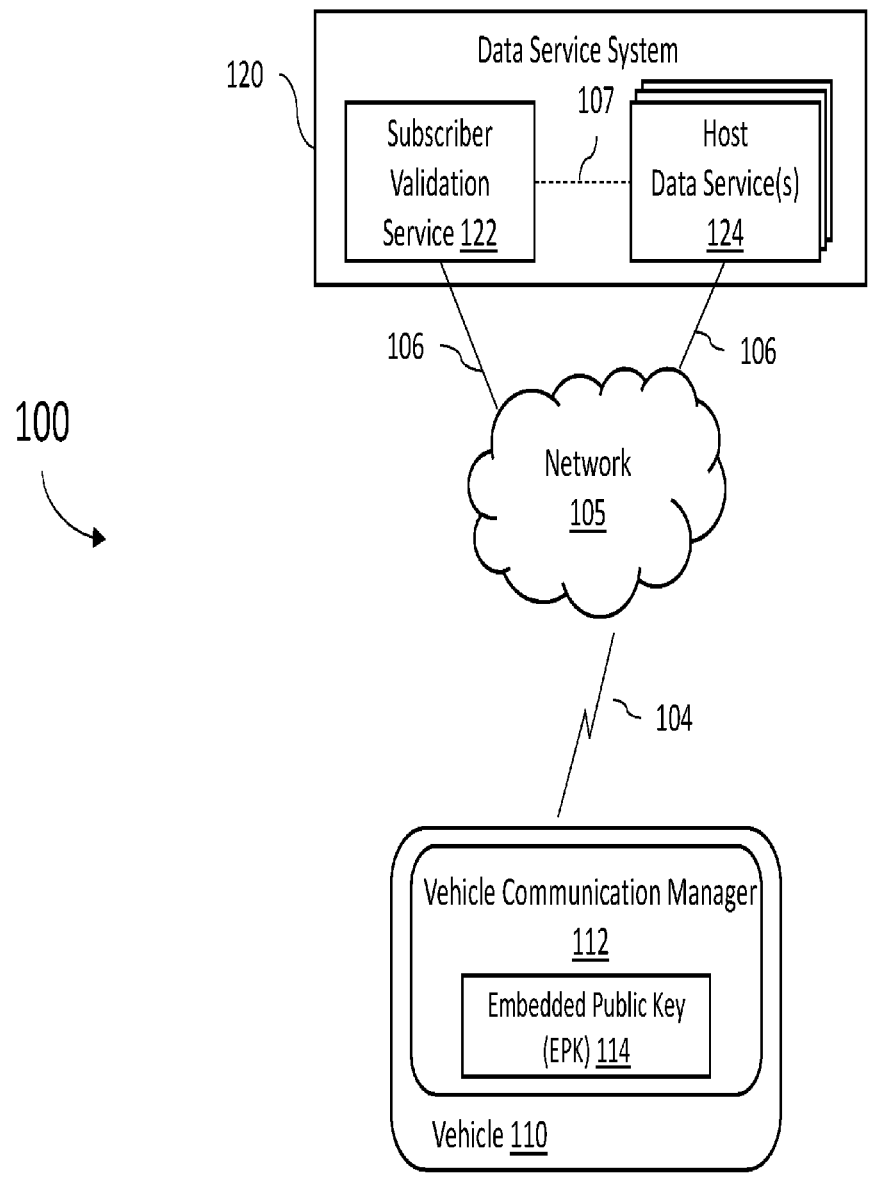
FIG. 1 is a diagram illustrating a vehicle data service system of one embodiment of the present disclosure

FIG. 1 is a diagram illustrating a vehicle diagram illustrating a vehicle data service system 100 of one embodiment of the present disclosure. As shown in FIG. 1, vehicle data service system 100 includes a data service system 120 and at least one vehicle 110 that subscribes to data services offered by the data service system 120. Vehicle 110 is not limited to any one type of vehicle, but in alternate embodiments may comprise, for example, any form of automobile, truck, train, aircraft, spacecraft, or water vessel. Data service system 120 may comprise one or more network nodes, servers, data storage devices with databases and/or other devices configured to provide one or more vehicles, such as vehicle 110, with data such as but not limited to travel advisories, weather information, passenger and/or cargo manifests, gate and/or terminal information, destination and routing information and schedules, clearances, maintenance data, passenger entertainment, and/or public Internet connectivity. In some implementations, vehicle 110 comprises an aircraft and data service system 120 provides Aircraft Communications Addressing and Reporting System (ACARS) data services, which may be hosted, for example, by a government agency, an airline's operations department, or as a third-party subscription service.

In the embodiment shown in FIG. 1, the data service system 120 comprises two primary components, a subscriber validation service 122 and at least one host data service 124. As explained in greater detail below, the host data service 124 comprises one or more servers that operate to provide vehicle 110 with the data described above through the exchange of uplink (UL) and downlink (DL) data service messages. In some embodiments, the data service system 120 may comprise multiple host data services 124. For example, in some embodiments, two independent host data service 124 elements within the same data service system 120 may be utilized to provide load balance or to implements a secondary host data service 124 that acts as backup for a primary host data service 124. In other embodiments, data service system 120 may include access to multiple host data services 124 separated from subscriber validation service 122, with each host data services 124 applicable to different fleet operators or airlines, for example. It should be noted that regardless of how many host data service 124 instances are accessible through the data service system 120, vehicle 110 will need to go through the subscriber validation service 122 first, before being granted access to any host data service 124.

The subscriber validation service 122 comprises servers that function to authenticate that vehicle 110 is authorized to access the services of the host data service 124, and provides the vehicle 110 with a set of public operational keys that are used for establishing communications with the host data service 124. As explained below, with embodiments of the present disclosure, the vehicle 110 need only ever store the public keys of any public-private key pairs, alleviating vehicle 110 of the complexities and/or expensive hardware needed to store private keys and the risks of having such private keys extracted from vehicle hardware by unscrupulous actors.

In some embodiments, the subscriber validations service 122 and host data service 124 may be integrated together as a single computing system and/or network operated by a single system operator. In other embodiments, the subscriber validation service 122 may operate with one or more separate host data services 124 hosted on networks independent of those used for the subscriber validation service 122. For example, access to data service providers may be offered as a service by the operator of the subscriber validation service 122 while the actual relevant data and servers to provide that data resides with the host data service 124. For embodiments where the subscriber validation service 122 and host data service 124 are not physically integrated as a single system, they may be communicatively connected by a proprietary communications link 107 between the two services. Alternatively, the subscriber validation service 122 and host data service 124 may each comprise network connections 106 with a network 105 (which may comprise an Internet Protocol (IP) network such as but not limited to the public Internet, for example) and communicate through network 105 via the network connections 106. It should be noted that for still other implementations that include multiple available host data services 124, one or more of those available host data service 124 may be integrated with the subscriber validations service 122, while one or more other host data service 124 may be hosted on by operators on networks independent of those used for the subscriber validation service 122.

As shown in FIG. 1, the vehicle 110 establishes a wireless connection 104 with the network 105 through which it communicates to access the services of the data service system 120. The wireless connection 104 may be established using any applicable form of wireless connectivity including, but not limited to, IEEE 802.11 (WiFi), cellular communications, optical communications, or other radio and/or satellite communications. Onboard vehicle 110, a vehicle communications manager 112 comprises the functionality to implement protocols, described below, for establishing communications between the vehicle 110 and the data service system 120. For example, vehicle communications manager 112 may execute an Internet Protocol (IP) stack for exchanging messages and packets with the network 105. In some embodiments, the vehicle communications manager 112 may be implemented as one or more specialized hardware components onboard the vehicle. In other embodiments, some or all of the functions attributed to the vehicle communications manager 112 may be virtualized or otherwise executed or performed by other onboard vehicle components. As shown in FIG. 1, at least one component of the vehicle communications manager 112 stores an embedded public key (EPK) 114 with which it may authenticate messages received from the subscriber validation service 122. The EPK may be either hardcoded or otherwise embedded in a non-volatile memory storage device such as firmware, EPROM, non-volatile memory, or other non-volatile hardware components of the vehicle communications manager 112, for example. As the term is used herein, a non-volatile memory storage device may comprise any long-term persistent storage hardware that maintains saved data even when power is removed.

With the embodiments described herein, there is no need for vehicle communications manager 112 to hold its own private key, and it does not otherwise store public key infrastructure (PKI) digital certificates in order to utilize the EPK 114. As such, EPK 114 is referred to herein as a self-reliant public key as it is a public key reliant on a trusted ability to authenticate messages from the subscriber validation service, without the need for further resources beyond the EPK 114 itself. Moreover, as further explained below, the vehicle communications manager 112 in the embodiments described herein, never needs to obtain possession of any PKI private key in order to establish bidirectional authenticated vehicle data service communications with the data service system 120.

Figure 2:
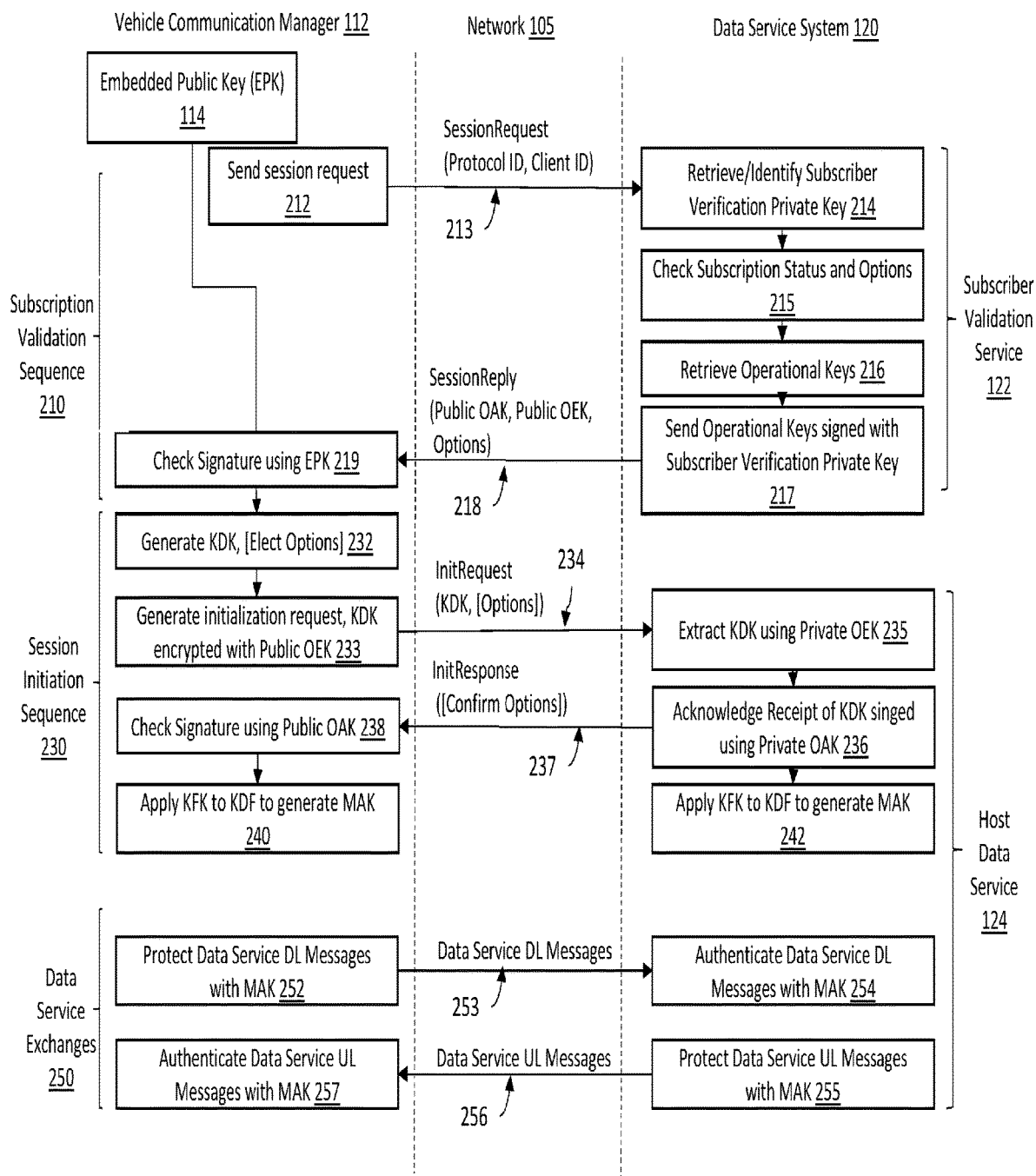
FIG. 2 is a process flow diagram illustrating a process for establishing authenticated communications between a vehicle communication manager and a data service system as shown in FIG. 1 using an embedded public key.

FIG. 2 is a process flow diagram illustrating the process of establishing authenticated communications between the vehicle communication manager 112 and the data service system 120 using the EPK 114. The fixed EPK 114 is utilized to setup a secure connection between the vehicle 112 and data service system 120 through distinct message exchange sequences which comprise a subscriber validation sequence 210 and a session initiation sequence 230. Successful completion of the subscriber validation sequence 210 and the session initiation sequence 230 leads to the ability to perform data service exchanges 250. It should be understood that in the process illustrated in FIG. 2, the same EPK 114 may be embedded within and used across multiple vehicles of an operator's vehicle fleet. For example, the EPK 114 may be set at the equipment factory so that replacement equipment received and/or warehoused by the vehicle operator will already have the necessary key pre-installed EPK 114 for performing the exchange shown in FIG. 2. It should also be noted that the pre-installed EPK 114 may be refreshed during periodic vehicle upgrades to mitigate the risk of compromised associated private keys. As will be described in greater detail below, the embedded EPK 114 is used to initiate the communications session. More specifically, the subscriber validation service 122 will deliver a set of operational public keys to the vehicle communication manager 112 as part of the subscriber validation sequence 210. During the session initiation sequence 230, the vehicle communication manager 112 and the host data service 124 will exchange information that will permit each to independently generate a shared message authentication key that is known to both, unique to that communication session, and which will be used to authenticate the exchange of uplink (UL) and downlink (DL) data service messages.

The subscription validation sequence 210 begins at 212 where the vehicle communications manager 112 transmits a session request message 213 to the subscriber validation service 122 of the data service system 120. As shown in FIG. 2, the session request message 213 comprises at least a protocol identifier (protocol ID) associated with the EPK 114 and may include a Client identifier (client ID). The protocol ID indicates to the subscriber validation service 122 which version of the EPK 114 the vehicle communication manager 112 is using. It should be noted that while the same EPK 114 may be used across multiple vehicles, it is also true that different sets of vehicle may operate using different EPKs. For example a firmware update to a vehicle communication manger 112 may also update the EPK 114 embedded in that vehicle communication manger 112. As such, an operator's fleet may comprise some vehicles where the firmware update has been performed, and others where the firmware update has not been performed. The protocol ID thus indicates or identifies which EPK 114 the vehicle has so that the subscriber validation service 122 may access the correct associated private key that corresponds to the EPK 114. The Client ID, may be used to identify the operator of the vehicle 110, or otherwise the holder of the subscription to the data service that vehicle 110 operates under. For example, where the data service system 120 offers services to multiple fleet operators (for example, different airlines) the Client ID will identify said operator of vehicle 110.

The subscriber validation service 122 will securely store a respective private key, referred to herein as a "subscriber verification private key", for each EPK which it recognizes as valid. For example, based on the protocol ID in the session request 213, the subscriber validation service 122 will retrieve and/or identify the subscriber verification private key associated with the EPK 114 as shown at 214. The subscriber validation service 122 will validate the current subscription status, as shown at 215, to authenticate that the session request 213 has been received by an authorized user of the data service system 120. For example, if the operator's subscription is suspended, the subscriber validation service 122 may decline to grant access, even if the EPK 114 is otherwise a valid key. In some embodiments, the subscriber validation service 122 may have access to a database or other data server in order to compare the Protocol ID and/or Client ID received with a listing of active subscriptions. The subscriber validation service 122 can also at this point determine whether the subscription held by the vehicle's operator includes one or more optional services. Optional services may include, for example, data encryption or data compression.

Once the subscription (and in some embodiments, optional services) is confirmed at 215, the sequence 210 continues to 216 where the subscriber validation service 122 retrieves a set of public operational keys associated with the host data service 124 for which the vehicle 110 holds a valid subscription. The set of public operational keys includes a public operational authentication key (OAK) and a public operational encryption key (OEK). In some embodiments, the public OAK and OEK are generated and provided by the host data service 124 to the subscriber validation service 122. The subscriber validation service 122 then generates and sends a session reply message 218 back to the vehicle communication manager 112. The session reply message 218 includes the public OAK and OEK (and in some embodiments, and indication any available optional services) and is signed by the Subscriber Verification Private Key. For embodiments where the subscriber validation service 122 and host data service 124 are not integrated, the session reply message 218 may further include a network address for the host data service 124. In one such embodiment, the network address for the host data service 124 may be based on subscription status information associated with the Protocol ID and/or Client ID.

It should be noted that the vehicle communication manager 112 again does not receive, and thus has no reason to be configured to store, any private keys associated with the public OAK and OEK. Moreover, because the session reply message 218 is signed using the Subscriber Verification Private Key that corresponds to the EPK 114, the vehicle communication manager 112 may authenticate that the session reply message 218 is being received from a valid source as shown at 219.

Once the vehicle communication manager 112 receives the public OAK and OEK, the subscription validation sequence 210 is complete, and the session initiation sequence 230 may commence. The session initiation sequence 230 begins at 232 with the vehicle communication manager 112 generating a Key Derivation Key (KDK) onboard the vehicle 110. The vehicle communication manager 112 may also at this point determine which of any optional services it is electing to use during this session. The KDK is encrypted using the public OEK. An initialization request message 234 is generated by the vehicle communication manager 112 which includes the encrypted KDK (and in some embodiments, an indication of any elected optional service). The initialization request message 234 is transmitted to the host data service 124. In some embodiments where the host data service 124 and subscriber validation service 122 are integrated, the initialization request message 234 may be transmitted back to the same network address that the session request 213 was transmitted to. In other embodiments where the host data service 124 and subscriber validation service 122 are not integrated, the initialization request message 234 may be transmitted to the network address indicated by the subscriber validation service 122 in the session reply message 218. The host data service 124, upon receiving the initialization request message 234 will decrypt the KDK using a private OEK corresponding to the public OEK, extract the KDK, and identify the election of an optional services, if applicable. At 236, the host data service 124 may then acknowledge receipt of the KDK by sending back to the vehicle communication manager 112 an initialization response message 237. The initialization response message 237 may further acknowledge the election of optional services. The initialization response message 237 is signed by the host data service 124 using the private OAK so that when the vehicle communication manager 112 received the initialization response message 237, it may use the public OAK it received to validate that the initialization response message 237 is being received from a valid source as shown at 238.

At this point in the session initiation sequence 230, the vehicle communication manger 112 and the host data service 124 will both be in possession of a shared item of information, the KDK, that was initially generated on-board the vehicle at the beginning of the session initialization sequence 230. From this point, the vehicle communication manager 112 and host data service 124 will each independently generate a matching symmetric key, referred to herein as the Message Authentication Key (MAK). More specifically, the vehicle communication manager 112 applies the KDK to a key derivation function (KDF) in order to generate the MAK as shown at 240. The MAK generated onboard the vehicle 110 is locally stored by the vehicle communication manager 112. The host data service 124, as shown at 242, also applies the KDK to the same KDF in order to generate an identical Message Authentication Key (MAK), which is locally stored by the host data service 124. As such, the host data service 124 and vehicle communication manager 112 will complete the session initiation sequence 230 both in possession of the same MAK without ever having to transmit the MAK through the network 105. In some embodiments, in addition to inputting the KDK, the KDF may further input additional data known to both the host data service 124 and vehicle communication manager 112 as seed data for generating the MAK. For example, in some embodiments, the KDF may input as additional seed data one or more parameters such as, but not limited to, a timestamp of the initialization request message 234, a timestamp of the initialization response message 237, the signature applied to the initialization response message 237, and/or the network address of the host data service 124. Inclusion of the timestamps of the initialization request message 234 and initialization response message 237 has the advantage of protecting against capture and replay attacks. For example, messages may be considered valid for only limited durations of time and alteration of timestamps will invalidate the signatures applied to those messages.

Upon completion of the session initiation sequence 230, the vehicle communication manger 112 and the host data service 124 will both be in possession of a shared MAK and authenticated data service exchanges may begin as shown at 250 to send data service information back and forth. For the remainder of this session, the vehicle communication manager 112 may use the MAK to protect data service DL messages 253 (as shown at 252) and the host data service 124 may authenticate received data service DL messages 253 using the same MAK (as shown at 254). Similarly, the host data service 124 may protect data service UL messages 256 (as shown at 255) and the vehicle communication manager 112 may authenticate receive data service UL messages 256 using the MAK (as shown at 257). In other words, to protect the messages the MAK is utilized to incorporate data in to the DL and UL messages, which may be processed by the recipient to confirm the identity of the message sender using the recipient's local copy of the MAK. In some embodiments, the authentication algorithms used to authenticate the data service UL and DL messages may apply the first 128 bits of a hash-based message authentication code (HMAC) computed using the MAK. Such a symmetric cyrypto-algorithm may be executed very quickly so that the authentication process does not produce any significant latency issues.

The entire process to arrive at the shared MAK is achieved without the need to ever store a private key onboard the vehicle 110 but still provide bidirectional authenticity and security. The subscriber validation service 122 and host data service 124 may be integrated, or alternatively separate and provided by different entities and hardware. Moreover, the MAK is valid for the length of a single communications session. Once a connection is lost, the session ends and a new MAK is established.

Figure 3:
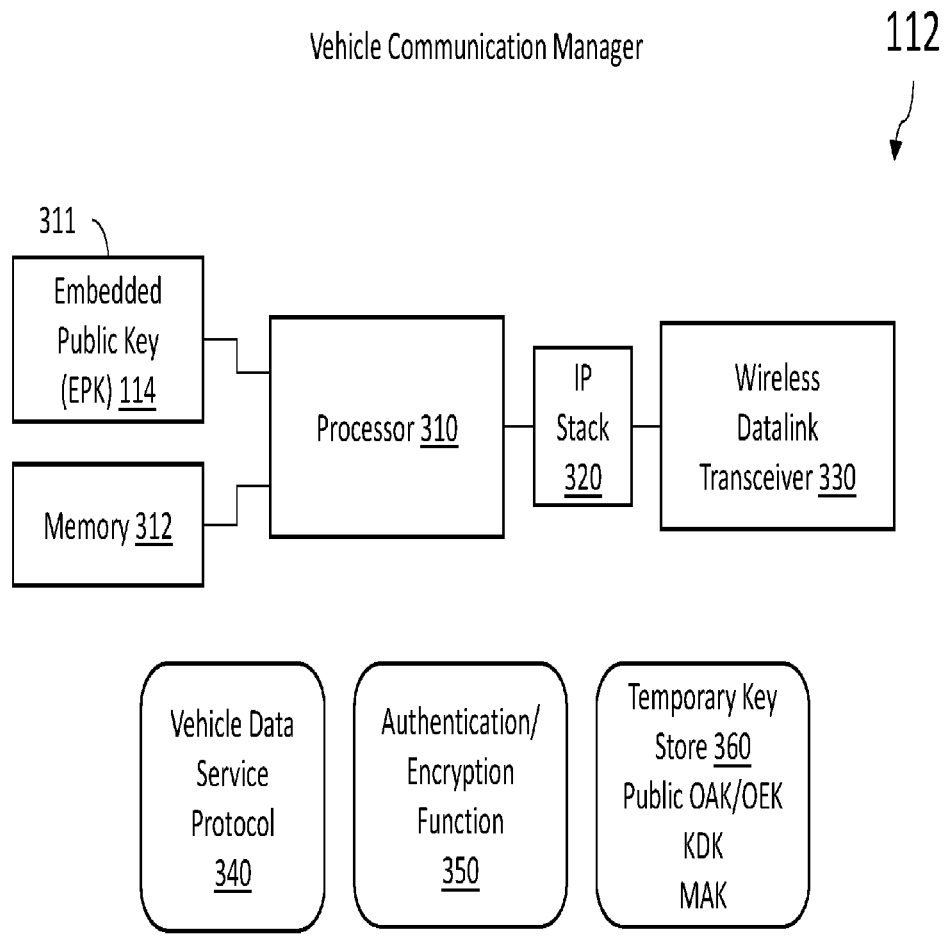
FIG. 3 is a block diagram illustrating a vehicle communication manager as shown in FIG. 1 of one embodiment of the present disclosure.

FIG. 3 is a block diagram illustrating a vehicle communication manager 112 of one embodiment of the present disclosure. As discussed above, in some embodiments, the elements of the vehicle communication manager 112 may be implemented using discrete hardware components. In other embodiments, one or more the elements of the vehicle communication manager 112 may be virtualized and executed by processing hardware onboard the vehicle 110.

For example, where the vehicle 110 comprises an aircraft, the vehicle communication manager 112 described herein may be realized within either a communications management unit (CMU) device installed on the aircraft, or within a communications management function (CMF) executed via onboard processing hardware.

In the embodiment shown in FIG. 3, the vehicle communication manager 112 comprises a processor 310 coupled to a memory 312 and programed to execute code to perform the functions of the vehicle communication manager described in this disclosure. The processor 310 has access to a data storage hardware device 311 in which the EPK 114 is embedded. The processor is coupled to at least one wireless datalink transceiver 330 through which wireless communication links 104 with the network 105 are established. For embodiments where the network 105 comprises an IP network, the vehicle communication manager 112 comprises an IP stack 320 through which communications traffic via links 104 are transmitted and received by the vehicle communication manager 112 are processed. In one embodiment, the vehicle communication manager 112 further comprises a vehicle data service protocol 340 which may be stored in the memory 312 and executed by the processor 310 to carry out the subscription validation sequence 210, session initiation sequence 230 and data service exchanges 250 attributed to the vehicle communication manager 112. The vehicle communication manager 112 may further comprise at least one authentication and encryption function 350 stored in the memory 312 and executed by the processor 310 to carry out the message signing, authentication, encryption, and decryption processes for carrying out the subscription validation sequence 210, session initiation sequence 230 and data service exchanges 250. Moreover, as shown in FIG. 3, the vehicle communication manager 112 further comprises a temporary key store 360 (which may be within memory 312) for storing the public OAK and OEK, the KDK and the MAK keys used through-out the subscription validation sequence 210, session initiation sequence 230 and data service exchanges 250. While the EPK 114 remains embedded within the vehicle communication manager for long term use, the keys stored in the key store may be discarded after a data service session is completed.

Figure 4:
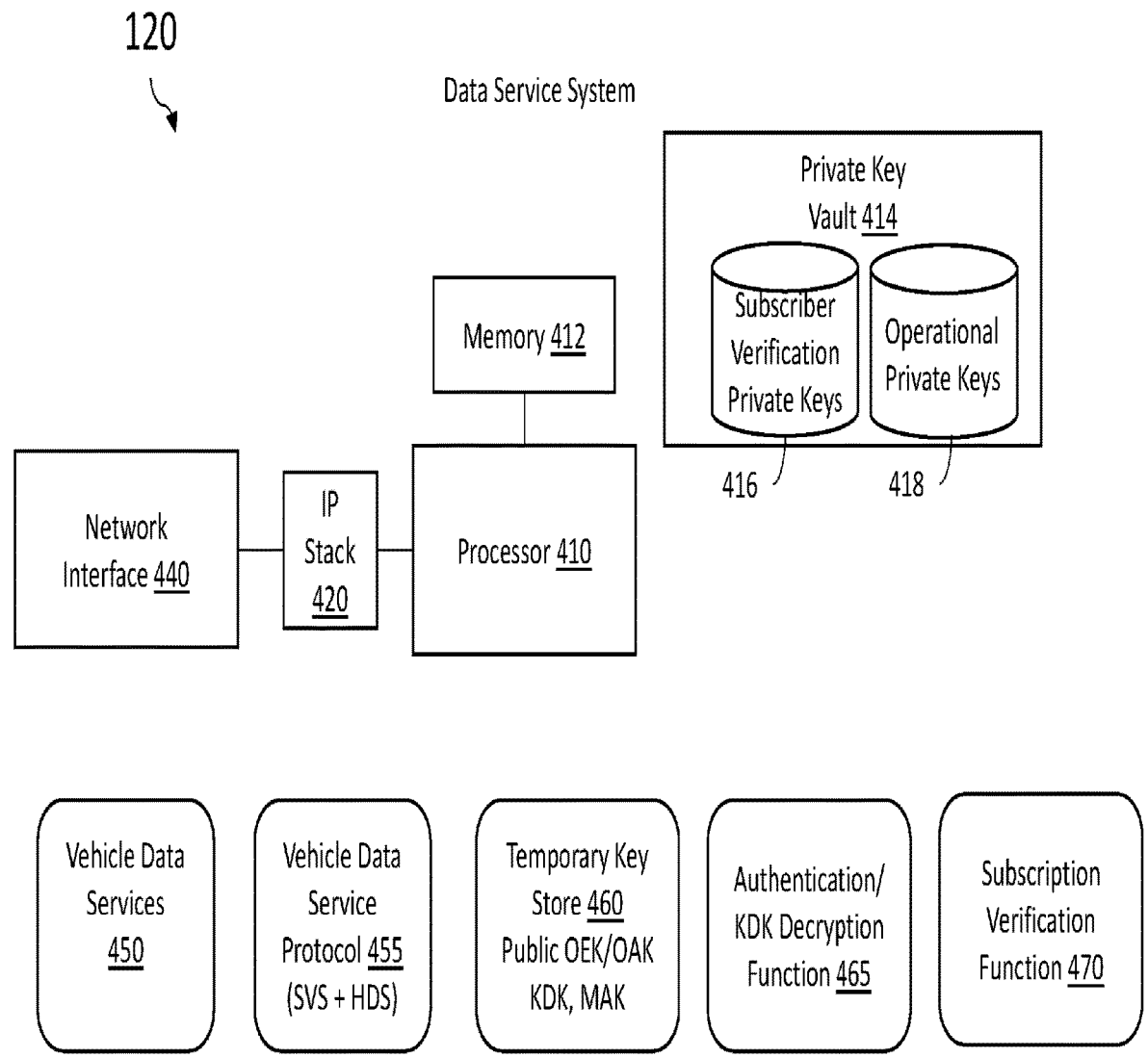
FIG. 4 is a block diagram illustrating an integrated data service system for a vehicle data service system of one embodiment of the present disclosure.

FIG. 4 is a block diagram illustrating a data service system 120 of one embodiment of the present disclosure where the subscriber validation service 122 and host data service 124 comprise an integrated implementation. That is, in this embodiment, the subscription service provider and the provider hosting the endpoint vehicle data services servers are the same.

In the embodiment shown in FIG. 4, the data service system 120 comprises a processor 410 coupled to a memory 412 and programed to execute code to perform the functions of the data service system 120 described in this disclosure. The processor 410 has access to a private key vault 414 in which the subscriber verification private keys 416 are securely stored. In embodiments, the private key vault 414 comprises a secure hardware device vault or chip comprising protection mechanisms designed to store private keys in an encrypted format.

In one embodiment, when a message needs to be encrypted, decrypted, signed or authenticated using a private key, the message is sent to the private key vault 414 and processed internally by the private key vault 414 which then generates an output that is encrypted, decrypted, signed or authenticated using the appropriate private key. In one embodiment, the private key vault 414 stores an associated subscriber verification private key for each respective EPK 114 recognized by the subscriber validation service 122. As shown in FIG. 4, the private key vault 414 in this particular integrated embodiment also stores operational private keys 418, associated with the public OAK and OEK keys transmitted to the vehicle communication manager 112. The operational private keys 418 may be applied to messages by the processor 410 in the same manner as just described for the subscriber verification private keys 416.

The processor 410 is coupled to at least one network interface 440 through which communication links 106 with the network 105 are established. For embodiments where the network 105 comprises an IP network, the data service system 120 comprises an IP stack 420 through which communications traffic via links 106 are transmitted and received. In one embodiment, the data service system 120 further comprises a vehicle data service protocol 455 which may be stored in the memory 412 and executed by the processor 410 to carry out the subscription validation sequence 210, session initiation sequence 230 and data service exchanges 250 attributed to the data service system 120. Moreover, as shown in FIG. 4, the data service system 120 further comprises a temporary key store 460 (which may be within memory 412) for storing the public OAK and OEK, the KDK and the MAK keys used through-out the subscription validation sequence 210, session initiation sequence 230 and data service exchanges 250. The data service system 120 may further comprise at least one authentication and KDK decryption function 465 stored in the memory 412 and executed by the processor 410 to carry out the message signing, authentication, and KDK decryption processes using keys associated with those cryptographic processes.

In one embodiment, the data service system 120 comprises a subscription verification function 470 which may be stored in the memory 412 and executed by the processor 410 to perform the subscription status and options check at 215 of the subscription validation sequence. In one embodiment, subscription status and options information is stored in the memory 412 which may be updated at some periodic basis. The subscription verification function 470 may then access this information from the memory 412. In other embodiments, the subscription verification function 470 may communicate with another subscription status and options information (such as via network 105) in order to validate the subscription status and optional service available to a vehicle. In some embodiments, the subscription verification function 470 may utilize the Protocol ID and/or Client ID to retrieve information regarding the subscription status and optional service available to a vehicle. The vehicle data service 450 may comprise a plurality of functions executed by processor 410 and/or distributed across other processing systems for delivering the vehicle data services subscribed to by the operator of the vehicle 110. That is, the data service DL messages 253 and data service UL messages 256 exchanged with the vehicle communication manager 112 are processed by the vehicle data service 450 to provide the vehicle 110 with the data to which it subscribes. For example, in the case where vehicle 110 comprises an aircraft and data service system 120 provides ACARS data services, the vehicle data service 450 is the element of the host data service 124 that actually performs and provides the ACARS data services.

Figure 5:
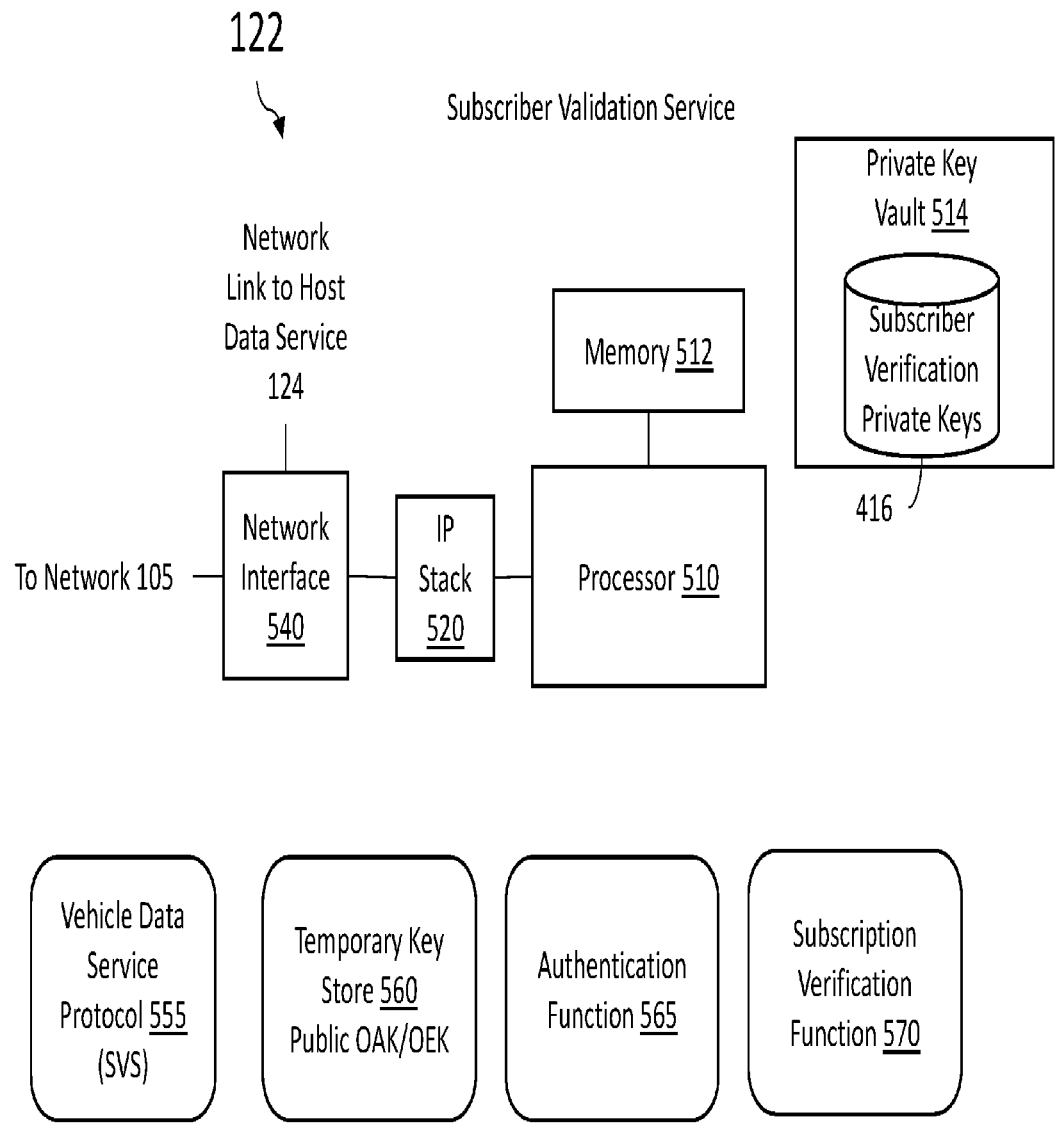
FIG. 5 is a block diagram illustrating a subscriber validation service of a non-integrated data service system for a vehicle data service system of one embodiment of the present disclosure.
Figure 6:
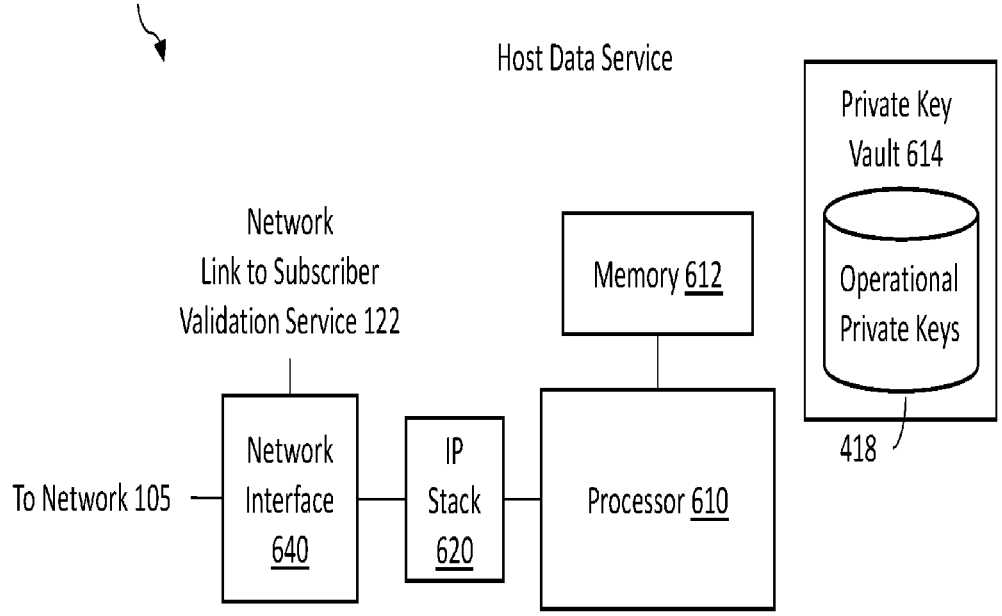
FIG. 6 is a block diagram illustrating a host data service of a non-integrated data service system for a vehicle data service system of one embodiment of the present disclosure.
Figure 6:
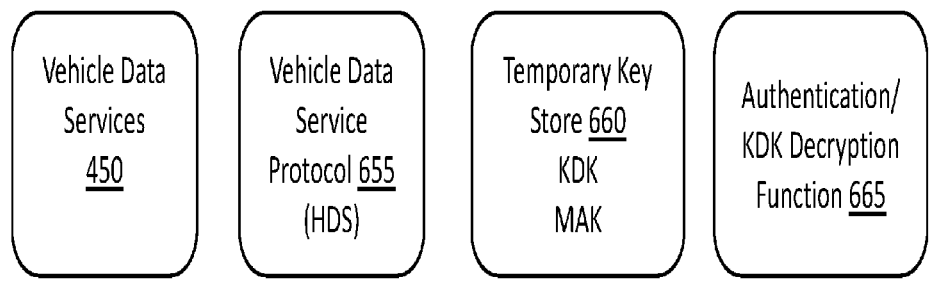

FIGS. 5 and 6 are block diagrams illustrating a data service system 120 of one embodiment of the present disclosure where the subscriber validation service 122 and host data service 124 are not integrated, but are instead fully separate services. That is, the functions of the subscriber validations service 112 and the host data service 124 are separated. In this embodiment, the subscriber validation service 122 may receive the public OEK and OAK from the host data service 124 (so that it may forward them to the vehicle 110 to complete the subscription validation sequence 210) but not receive the associated private OEK and OAK, which are instead maintained strictly by the host data service 124. This configuration has the advantage of providing end-to-end security from the perspective of the host data service 124 because the subscriber validation service 122 is out of the loop and not involved in the communication of data service DL and UL messages, even though the subscriber validation service 122 will still first validate that the host data service 124 is authorized to have data service exchanges with a specific vehicle 110. The operator of the host data service 124 will generate and maintain the public and private OEK and OAK.

FIG. 5 is a block diagram illustrating the subscriber validation service 122 for such an embodiment. In the embodiment shown in FIG. 5, the subscriber validation service 122 comprises a processor 510 coupled to a memory 512 and programed to execute code to perform the functions of the subscriber validation service 122 described in this disclosure. The processor 510 has access to a private key vault 514 in which the subscriber verification private keys 516 are securely stored. The private key vault 514 comprises a secure hardware device vault or chip comprising protection mechanisms designed to store private keys in an encrypted format such as described with respect to FIG. 4 and private key vault 414.

In one embodiment, when a message needs to be signed or authenticated using a private key, the message is sent to the private key vault 514 and processed internally by the private key vault 514 which then generates an output that is signed or authenticated using the appropriate private key. In one embodiment, the private key vault 514 stores an associated subscriber verification private key for each respective EPK 114 recognized by the subscriber validation service 122. The processor 510 is coupled to at least one network interface 540 through which one or more communication links 106 with the network 105 are established. For embodiments where the network 105 comprises an IP network, the subscriber validation service 122 comprises an IP stack 520 through which communications traffic via links 106 are transmitted and received. In one embodiment, the subscriber validation service 122 further comprises a vehicle data service protocol 555 which may be stored in the memory 412 and executed by the processor 410 to carry out the subscription validation sequence 210 attributed to the subscriber validation service 122. Moreover, as shown in FIG. 5, the subscriber validation service 122 further comprises a temporary key store 560 (which may be within memory 512) for storing the public OAK and OEK, keys used during the subscription validation sequence 210. The subscriber validation service 122 may further comprise at least one authentication function 565 stored in the memory 512 and executed by the processor 510 to carry out message signing and authentication processes using public keys.

In one embodiment, the subscriber validation service 122 comprises a subscription verification function 570 which may be stored in the memory 512 and executed by the processor 510 to perform the subscription status and options check at 215 of the subscription validation sequence 210. In one embodiment, subscription status and options information is stored in the memory 512 which may be updated at some periodic basis. The subscription verification function 570 may then access this information from the memory 512. In other embodiments, the subscription verification function 570 may communicate with another subscription status and options information (such as via network 105) in order to validate the subscription status and optional service available to a vehicle. In some embodiments, the subscription verification function 570 may utilize the Protocol ID and/or Client ID to retrieve information regarding the subscription status and optional service available to a vehicle.

FIG. 6 is a block diagram illustrating the host data service 124 for a non-integrated embodiment. In the embodiment shown in FIG. 6, the host data service 124 comprises a processor 610 coupled to a memory 612 and programed to execute code to perform the functions of the host data service 124 described in this disclosure. The processor 610 has access to a private key vault 614 in which securely stores the operational private keys 518 associated with the public OAK and OEK keys transmitted to the vehicle communication manager 112. The private key vault 614 comprises a secure hardware device vault or chip comprising protection mechanisms designed to store private keys in an encrypted format such as described with respect to FIG. 4 and private key vault 414.

In one embodiment, when a message needs to be signed or authenticated, or the KDK decrypted, using a private key the message is sent to the private key vault 614 and processed internally by the private key vault 614 which then generates an output that is decrypted, signed and/or authenticated using the appropriate private key. In one embodiment, the private key vault 614 stores an associated private OAK and OEK keys for each set of public OAK and OEK keys utilized for the host data service 124. The processor 610 is coupled to at least one network interface 640 through which one or more communication links 106 with the network 105 are established. For embodiments where the network 105 comprises an IP network, the host data service 124 comprises an IP stack 620 through which communications traffic via links 106 are transmitted and received. In one embodiment, the host data service 124 further comprises a vehicle data service protocol 555 which may be stored in the memory 412 and executed by the processor 410 to carry out the session initiation sequence 230 and data service exchanges 250 attributed to host data service 124. Moreover, as shown in FIG. 6, the host data service 124 further comprises a temporary key store 660 (which may be within memory 612) for storing the public OAK and OEK keys, the KDK and the MAK used during the session initiation sequence 230 and data service exchanges 250. The host data service 124 may further comprise at least one authentication and KDK decryption function 665 stored in the memory 612 and executed by the processor 610 to carry out message signing, authentication, and KED decryption processes using public keys.

The host data service 124 further comprises the vehicle data service 650, which may include a plurality of functions executed by processor 610 and/or distributed across other processing systems for delivering the vehicle data services subscribed to by the operator of the vehicle 110. That is, the data service DL messages 253 and data service UL messages 256 exchanged with the vehicle communication manager 112 are processed by the vehicle data service 650 to provide the vehicle 110 with the data to which it subscribes. For example, in the case where vehicle 110 comprises an aircraft and data service system 120 provides ACARS data services, the vehicle data service 650 is the element of the host data service 124 that actually performs and provides the ACARS data services.

Example Embodiments

Example 1 includes a vehicle communication manager device located onboard a vehicle, the device comprising: a memory comprising a non-volatile memory device storing a fixed embedded public key, wherein the embedded public key is a public key of a public-private key pair associated with a data service system not onboard the vehicle; a processor in communication with a wireless datalink transceiver; a vehicle data service protocol executed by the processor, wherein the vehicle data service protocol initiates a communication session for data service exchanges with the data service system via the wireless datalink transceiver; wherein the vehicle data service protocol includes a session validation sequence that causes the processor to: transmit a session request message to the data service system; and validate an authenticity of a session reply request message received from the data service system using the embedded public key, wherein the session reply message includes a public operational authentication key, a public operational encryption key, and is signed with a subscriber validation private key associated with the embedded public key; wherein the vehicle data service protocol includes a session initiation sequence that causes the processor to: transmit an initiation request message to the data service system, the session request message including a key derivation key generated onboard the vehicle, wherein the key derivation key in the initiation request message is encrypted using the public operational encryption key; validate an authenticity of an initiation response message received from the data service system using the public operational authentication key; and in response to affirmatively validating the initiation response message, apply the key derivation key to a key derivation function to generate a message authentication key; wherein the processor authenticates data service uplink messages received from the host data service during the communication session using the message authentication key.

Example 2 includes the device of example 1, wherein the processor protects data service downlink messages sent to a host data service of the data service system during the communication session using the message authentication key.

Example 3 includes the devices of any of examples 1-2, wherein the session request message includes a protocol identifier (ID) that identifies the embedded public key stored in the memory.

Example 4 includes the devices of any of examples 1-3, wherein the session reply message further includes an indication of one or more optional services available to the vehicle communication manager.

Example 5 includes the devices of any of examples 1-4, wherein the data service system generates a replica of the message authentication key and the data service uplink messages are protected using the replica of the message authentication key.

Example 6 includes the devices of any of examples 1-5, wherein the data service system comprises a subscription validation service and the host data service, wherein the vehicle communication manager communicates with the subscription validation service during the session validation sequence, and wherein the vehicle communication manager communicates with the host data service during the session initiation sequence.

Example 7 includes the device of example 6, wherein the session validation sequence is accessible through a first network address and the host data service is accessible through a second network address, wherein the second network address is communicated to the vehicle communication manager by the session reply message.

Example 8 includes the device of example 7, wherein the wireless datalink transceiver is configured to communicatively couple the processor to a network, wherein the subscription validation service and the host data service are communicatively coupled to the network.

Example 9 includes the devices of any of examples 1-8, wherein the vehicle is an aircraft comprising either a communication management unit or a communication management function that executes the vehicle data service protocol.

Example 10 includes a vehicle data service system for providing to a vehicle access to data services, the vehicle data service system comprising: a processor in communication with a network interface; a private key vault device coupled to the processor; a vehicle data service protocol executed by the processor, wherein the vehicle data service protocol establishes a communication session for data service exchanges with a vehicle communication manager onboard the vehicle via the network interface; wherein the vehicle data service protocol includes a session validation sequence that causes the processor to: input a session request message received from the vehicle; and send a session reply message to the vehicle in response to the session request message, wherein the session reply message includes a public operational authentication key, a public operational encryption key, and is signed using a subscriber validation private key associated with an embedded public key stored within the vehicle communication manager.

Example 11 includes the data service system of example 10, wherein the session validation sequence further causes the processor to: determine a subscription status for the vehicle; wherein the public operational authentication key and the public operational encryption key are retrieved from a host data service based on the subscription status.

Example 12 includes the data service system of any of examples 10-11, wherein the session validation sequence causes the processor to determine a subscription status for the vehicle based on at least one identifier received from the vehicle in the session request message.

Example 13 includes the data service system of any of example 10-12, wherein the session validation sequence causes the processor to determine an availability of one or more optional services available to the vehicle communication manager based on at least one identifier received from the vehicle in the session request message; and wherein the session reply message further includes an indication of the one or more optional services available to the vehicle communication manager.

Example 14 includes the data service system of any of examples 10-13, wherein the data service system comprises a subscription validation service and a host data service, wherein the vehicle communication manager communicates with the subscription validation service during the session validation sequence.

Example 15 includes the data service system of example 14, wherein the vehicle communication manager communicates with the host data service during a session initiation sequence, wherein the session initiation sequence comprises: extracting a key derivation key from an initialization request message received from the vehicle communication manager, wherein the key derivation key in the initialization request message is encrypted using the public operational encryption key; in response to successfully extracting the key derivation key, transmitting an initialization response message to the vehicle communication manager, the initialization response message signed using a private operational authentication key; applying the key derivation key to a key derivation function to generate a message authentication key; wherein the host data service protects data service uplink messages received from the vehicle communication manager during the communication session using the message authentication key.

Example 16 includes the data service system of example 15, wherein the host data service further authenticates data service downlink messages sent to the vehicle communication manager during the communication session using the message authentication key Example 17 includes the data service system of any of examples 15-16, wherein the vehicle communication manager generates a replica of the message authentication key and the data service downlink messages are protected using the replica of the message authentication key.

Example 18 includes the data service system of any of examples 15-17, wherein the session validation sequence is accessible through a first network address and the host data service is accessible through a second network address, wherein the second network address is communicated to the vehicle communication manager by the session reply message Example 19 includes the data service system of any of examples 15-18, wherein the vehicle is communicatively coupled by a wireless datalink to the data service system through a network, wherein the subscription validation service and the host data service are communicatively coupled to the network.

Example 20 includes the data service system of any of examples 15-19, wherein the vehicle is an aircraft comprising either a communication management unit or a communication management function that implements the vehicle communication manager.

In various alternative embodiments, system and/or device elements, method steps, or example implementations described throughout this disclosure (such as but not limited to any of the Vehicle Communication Manager, Data Service System Subscriber Validation Service, Host Data Service, Public Key Stores, Private Key Vaults, Data Service Protocols, Network Interfaces, Authentication and Encryption Functions, Subscription Verification Functions or sub-parts of any thereof, for example) may be implemented at least in part using one or more computer systems, field programmable gate arrays (FPGAs), or similar devices comprising a processor coupled to a memory and executing code to realize those elements, processes, or examples, said code stored on a non-transient hardware data storage device. Therefore other embodiments of the present disclosure may include elements comprising program instructions resident on computer readable media which when implemented by such computer systems, enable them to implement the embodiments described herein. As used herein, the term "computer readable media" refers to tangible memory storage devices having non-transient physical forms. Such non-transient physical forms may include computer memory devices, such as but not limited to punch cards, magnetic disk or tape, any optical data storage system, flash read only memory (ROM), non-volatile ROM, programmable ROM (PROM), erasable-programmable ROM (E-PROM), random access memory (RAM), or any other form of permanent, semi-permanent, or temporary memory storage system or device having a physical, tangible form. Program instructions include, but are not limited to computer-executable instructions executed by computer system processors and hardware description languages such as Very High Speed Integrated Circuit (VHSIC) Hardware Description Language (VHDL).

As used herein, terms such as "server", "system", "service", "manager", "unit", "transceiver", "circuit", "memory", "module", "interface", "stack", each refer to non-generic device elements that would be recognized and understood by those of skill in the art and are not used herein as nonce words or nonce terms for the purpose of invoking 35 USC 112(f).

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the presented embodiments. Therefore, it is manifestly intended that embodiments be limited only by the claims and the equivalents thereof.

What is claimed is:

1. A data service system for providing to a vehicle access to data services, the data service system comprising:
 a hardware processor in communication with a network interface;
 a private key vault device coupled to the processor;
 a vehicle data service protocol executed by the processor, wherein the vehicle data service protocol establishes a communication session for data service exchanges with a vehicle communication manager onboard the vehicle via the network interface;
 wherein the vehicle data service protocol includes a session validation sequence that causes the processor to:
  input a session request message received from the vehicle; and
  send a session reply message to the vehicle in response to the session request message, wherein the session reply message includes a public operational authentication key, a public operational encryption key, and is signed using a subscriber validation private key associated with an embedded public key stored within the vehicle communication manager.

2. The data service system of claim 1, wherein the session validation sequence further causes the processor to:
 determine a subscription status for the vehicle;
 wherein the public operational authentication key and the public operational encryption key are retrieved from a host data service based on the subscription status.

3. The data service system of claim 1, wherein the session validation sequence causes the processor to determine a subscription status for the vehicle based on at least one identifier received from the vehicle in the session request message.

4. The data service system of claim 1, wherein the session validation sequence causes the processor to determine an availability of one or more optional services available to the vehicle communication manager based on at least one identifier received from the vehicle in the session request message; and
 wherein the session reply message further includes an indication of the one or more optional services available to the vehicle communication manager.

5. The data service system of claim 1, wherein the data service system comprises a subscription validation service and a host data service, wherein the vehicle communication manager communicates with the subscription validation service during the session validation sequence.

6. The data service system of claim 5, wherein the vehicle communication manager communicates with the host data service during a session initiation sequence, wherein the session initiation sequence comprises:
 extracting a key derivation key from an initialization request message received from the vehicle communication manager, wherein the key derivation key in the initialization request message is encrypted using the public operational encryption key;

in response to successfully extracting the key derivation key, transmitting an initialization response message to the vehicle communication manager, the initialization response message signed using a private operational authentication key;

applying the key derivation key to a key derivation function to generate a message authentication key;

wherein the host data service protects data service uplink messages received from the vehicle communication manager during the communication session using the message authentication key.

7. The data service system of claim 6, wherein the host data service further authenticates data service downlink messages sent to the vehicle communication manager during the communication session using the message authentication key.

8. The data service system of claim 6, wherein the vehicle communication manager generates a replica of the message authentication key and the data service downlink messages are protected using the replica of the message authentication key.

9. The data service system of claim 6, wherein the session validation sequence is accessible through a first network address and the host data service is accessible through a second network address, wherein the second network address is communicated to the vehicle communication manager by the session reply message.

10. The data service system of claim 6, wherein the vehicle is communicatively coupled by a wireless datalink to the data service system through a network, wherein the subscription validation service and the host data service are communicatively coupled to the network.

11. The data service system of claim 6, wherein the vehicle is an aircraft comprising either a communication management unit or a communication management function that implements the vehicle communication manager.

\* \* \* \* \*